(12) United States Patent
Akiyama

(10) Patent No.: US 7,080,040 B2
(45) Date of Patent: Jul. 18, 2006

(54) PRINTING MACHINE AND PRINTING SYSTEM

(75) Inventor: Hideki Akiyama, Ibaraki-ken (JP)

(73) Assignee: Riso Kagaku Corporation, Toyko (JP)

(*) Notice: Subject to any disclaimer, the term of this patent is extended or adjusted under 35 U.S.C. 154(b) by 238 days.

(21) Appl. No.: 10/100,030

(22) Filed: Mar. 19, 2002

(65) Prior Publication Data

US 2002/0159078 A1   Oct. 31, 2002

(30) Foreign Application Priority Data

Mar. 22, 2001  (JP)  .......................... P2001-082945

(51) Int. Cl.
*G06F 17/60* (2006.01)

(52) U.S. Cl. .................. 705/51; 358/1.1; 399/75

(58) Field of Classification Search ............ 705/51–58; 358/1–3, 426, 448, 468; 399/75–77, 80–85; 345/661–682, 700, 747; 715/517–529
See application file for complete search history.

(56) References Cited

U.S. PATENT DOCUMENTS

| | | | | |
|---|---|---|---|---|
| 4,035,795 A * | 7/1977 | Fosnough et al. | ............ | 341/26 |
| 5,012,280 A | 4/1991 | Tsutsumi et al. | ............ | 399/81 |
| 5,268,993 A * | 12/1993 | Ikenoue et al. | ............ | 358/1.15 |
| 5,555,104 A | 9/1996 | Todaka | ...................... | 358/468 |
| 5,615,015 A * | 3/1997 | Krist et al. | ................. | 358/296 |
| 5,966,718 A * | 10/1999 | Shibata | ...................... | 715/530 |
| 6,058,249 A * | 5/2000 | Matsuda et al. | ........... | 358/1.14 |
| 6,131,046 A * | 10/2000 | Sano et al. | ................. | 455/566 |
| 6,334,717 B1 * | 1/2002 | Uchida et al. | ............. | 358/1.13 |
| 6,384,934 B1 * | 5/2002 | Kohtani et al. | .............. | 358/1.9 |
| 6,587,651 B1 * | 7/2003 | Sadowara et al. | ............ | 399/27 |
| 6,791,703 B1 * | 9/2004 | Maeda et al. | .............. | 358/1.15 |
| 2002/0018123 A1 * | 2/2002 | Suzuki et al. | ............... | 348/211 |

FOREIGN PATENT DOCUMENTS

| EP | 926586 A2 * | 6/1999 |
|---|---|---|
| GB | 2 313 925 | 12/1997 |

OTHER PUBLICATIONS

Anderson et al., "Rights Management and Security in the Electronic Library", American Society for Information Science. Bulletin v22 n1, pp. 21-23, Oct./Nov. 1995, ISSN: 0095-4403.*

* cited by examiner

*Primary Examiner*—Mary D. Cheung
(74) *Attorney, Agent, or Firm*—Nath & Associates PLLC; Gregory B. Kang; Stanley N. Protigal

(57) ABSTRACT

A printing machine (1) and a printing system (A) are disclosed as having a ROM (5) which stores, in addition to a program for realizing a specific function available for service, all programs for realizing specific functions rendered non-available for service, with service permit information representative of service permit/prohibition of these specific functions being stored in a service permit information storing unit (7). A display and input device (4) provides a display of only the specific function rendered available for service in service permit information stored in the service permit information storing unit (7) whereby, when a particular specific function displayed over the display and input device (4), the program interrelated with the selected specific function is retrieved from the ROM (5) to be executed for operation to realize the selected specific function.

5 Claims, 7 Drawing Sheets

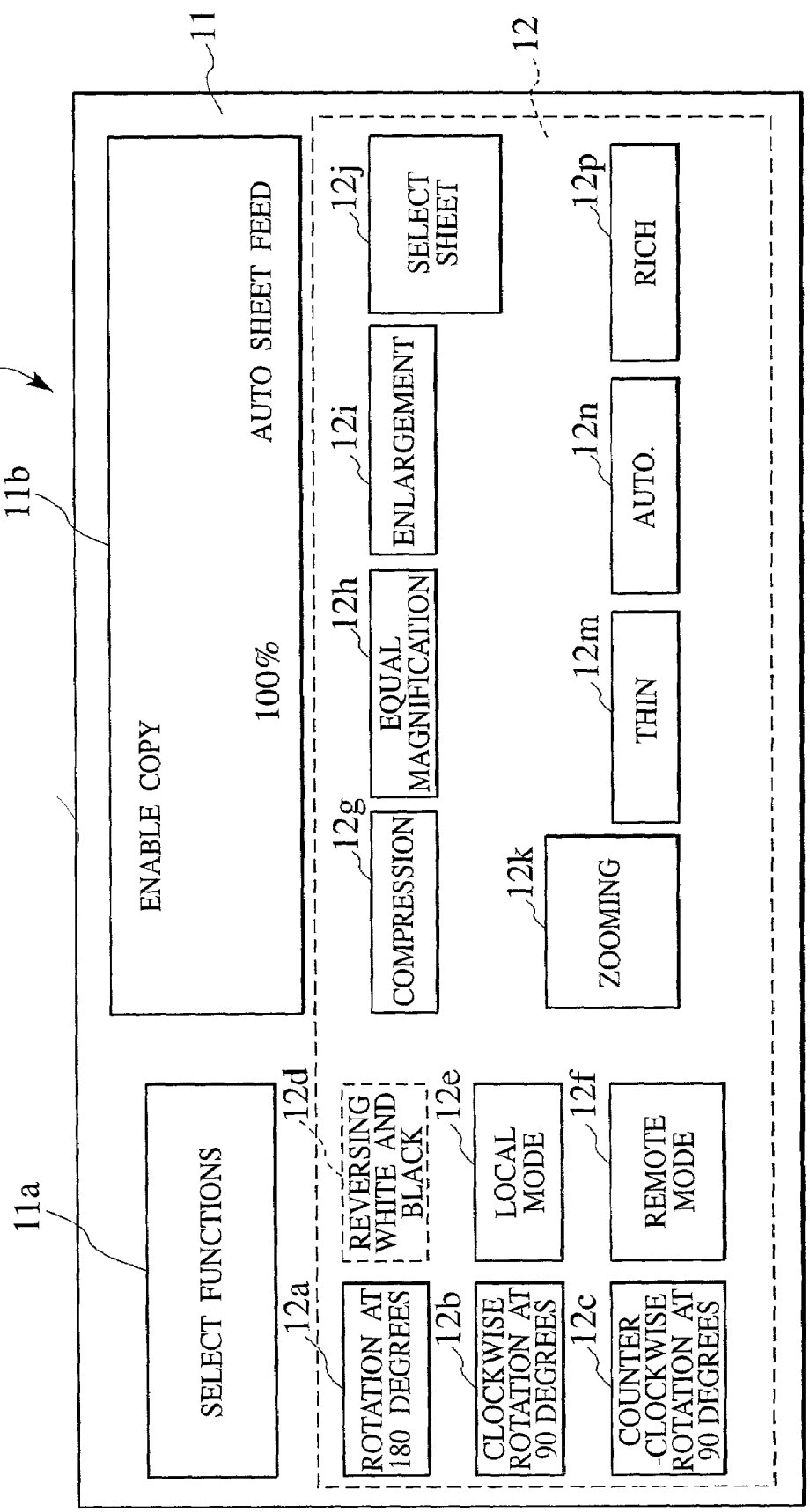

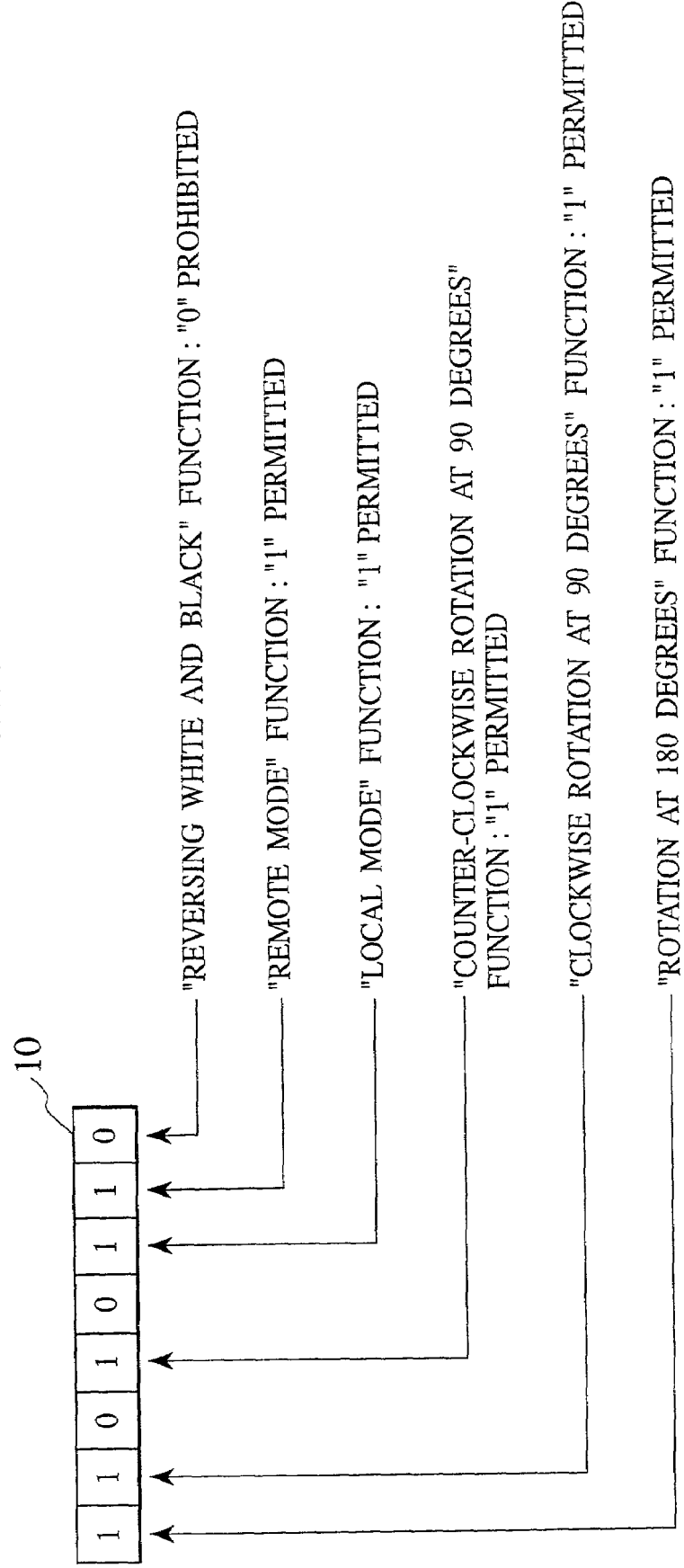

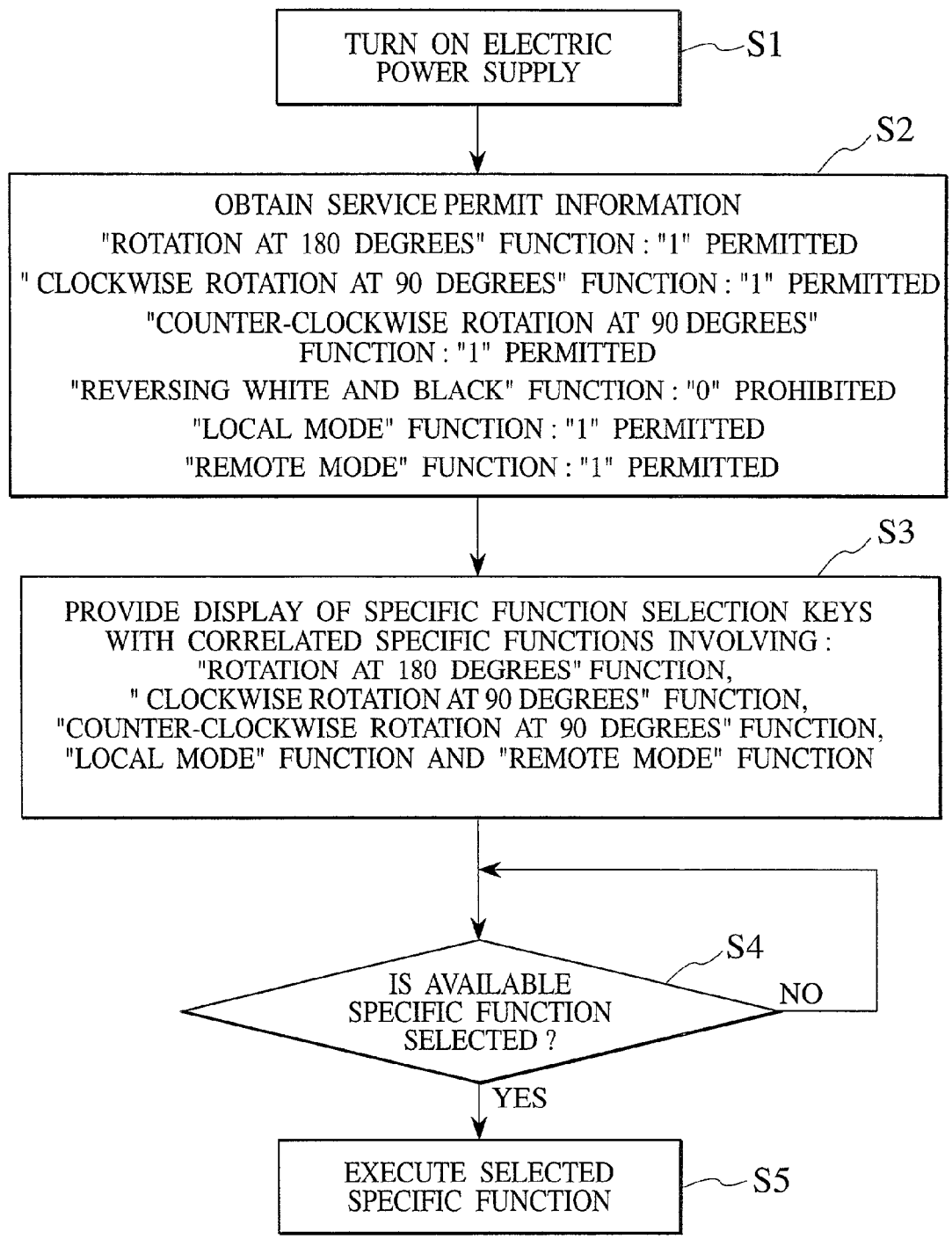

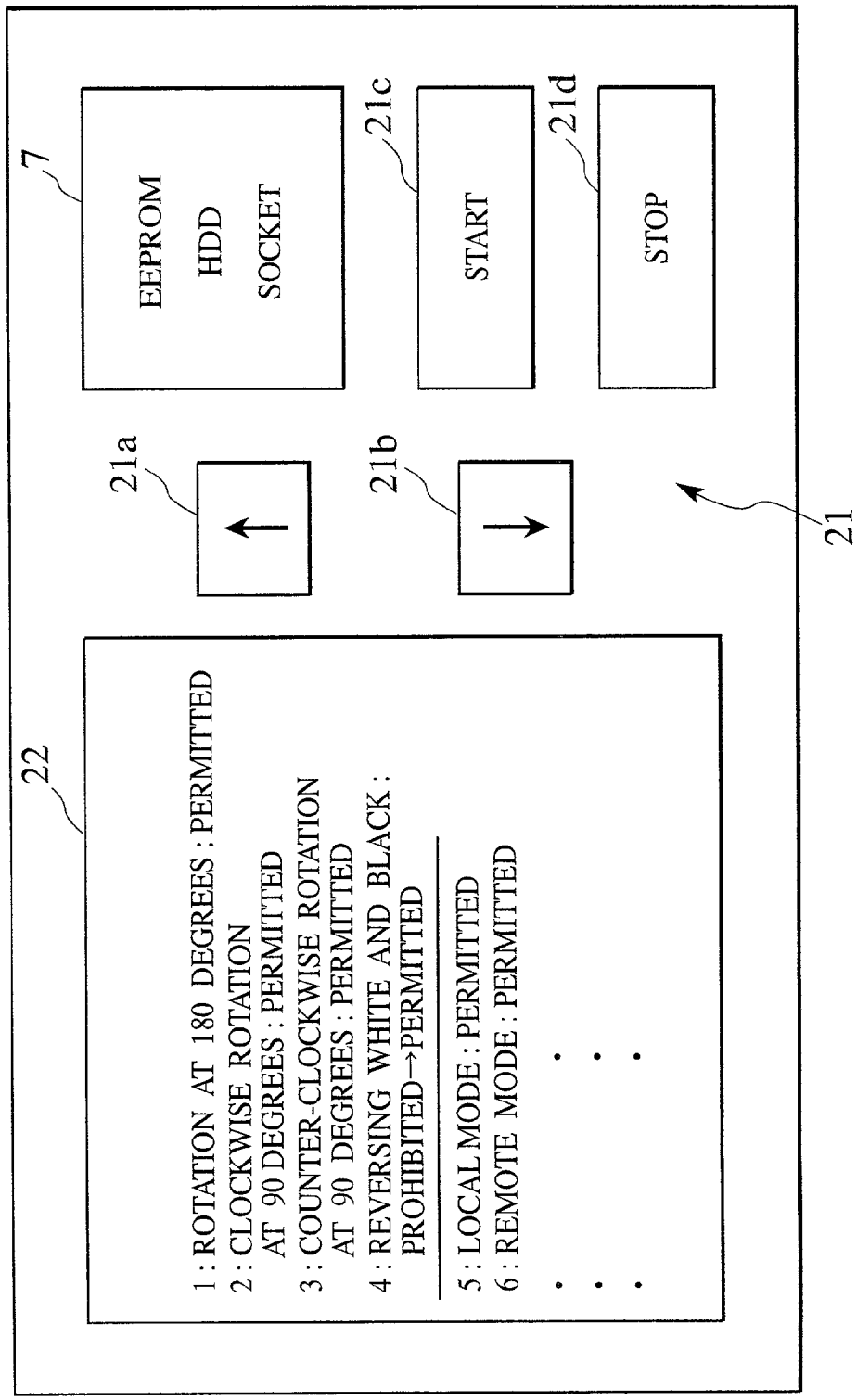

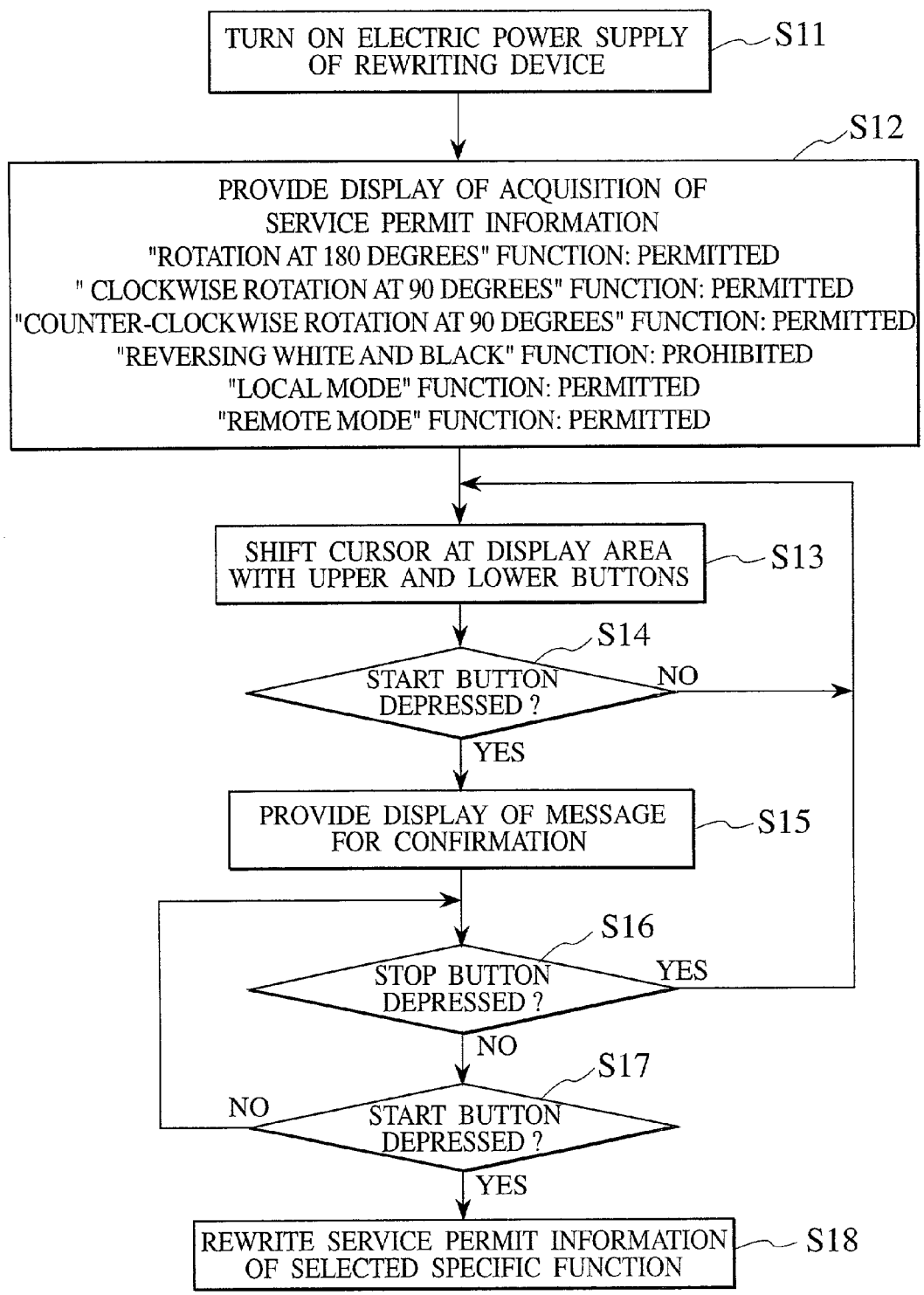

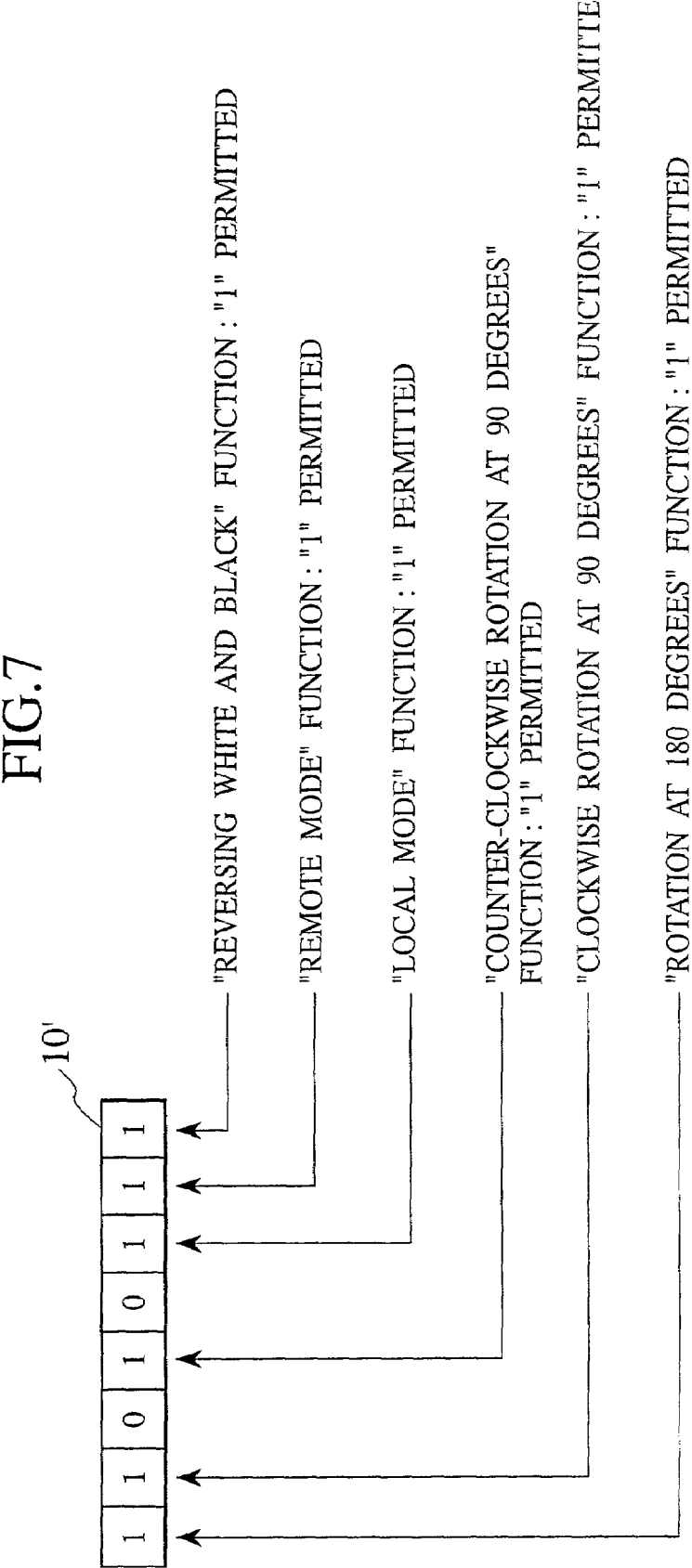

PRINTING MACHINE AND PRINTING SYSTEM

BACKGROUND OF THE INVENTION

The present invention relates to a printing machine having specific function such as, for example, a "Rotation At 180 Degrees" function or a "Reversing White And Black" function.

It is a usual practice for the printing machine to process data such as an image desired to be printed which is supplied from a remote or server personal computer for producing printing data (hereinafter referred to as print data) suited for the printing machine to compel it to execute printing operation of the image on the basis of such print data.

In recent years, for example, there is a wide use of printing machines having the specific functions such as the "Rotation At 180 Degrees" function which allows the image to be printed in an orientation rotated at 180 degrees or the "Reversing White And Black" function which allows the image to be printed under a condition wherein white and black areas of the image are inversed.

With the printing machines having such specific functions, for example, specified buttons are allocated to the respective specific functions whereby, when the specified buttons are depressed, data processing operation is executed to realize the specific functions associated with the respective specified functions. Further, another development includes a printing machine wherein a display unit of a touch panel type is arranged to provide a lumped display of contents of the respective functions such that, when a particular function is selected among the respective functions, the data processing operation is executed to realize the selected specific function.

By the way, it is required for the specific functions in the printing machines described above to have functions different from another in dependence on environments or purposes in service of the printing machines. And, in cases where the environments in service or the purposes in service of the printing machines are altered, there are some instances where a new function is required in addition to the specific functions previously incorporated in the printing machine and, further, there are some instances where the existing specific functions become useless.

In such cases, for example, in the printing machine wherein the specified buttons are allocated to the respective functions, there is a need for replacing the printing machine with new one to add, delete and alter the specific functions, resulting in an excessively heavy load being exerted to the user.

Further, with the printing machine wherein the display unit of the touch panel type is arranged to provide the lumped display of the contents of the respective functions, although there is no need for the printing machine to be replaced, rewriting programs for realizing the specific functions requires for the specific functions to be added, deleted and altered with undesired resulting requirement for troublesome works.

SUMMARY OF THE INVENTION

The present invention has been made with the above view in mind and is therefore an object of the present invention to provide a printing machine and a printing system which are able to provide an ease of adding, deleting and altering specific functions while increasing versatility.

According to a first aspect of the present invention, there is provided a printing machine which comprises a data processing unit for obtaining data to be printed and converting the data to be produced as print data, a print processing unit for executing printing operation on the basis of the print data produced by the data processing unit, a program storing unit for storing programs for realizing specific functions, a service permit information storing unit for storing service permit information representative of service permit/prohibition of the specific functions, and a display unit for providing a display of various information, wherein the data processing unit allows the display unit to provide the display of specific functions that are available for service in the service permit information stored in said service permit information storing unit, and allows the program interrelated with said specific function to be retrieved from the service permit information storing unit to execute an operation for realizing the specific function when the specific function displayed over said display unit is selected.

According to the first aspect of the present invention, the data processing unit obtains data to be printed and converts the same into print data. And, the print processing unit executes the printing operation on the basis of print data produced by the data processing unit. Also, with such printing machine, the display unit displays various information. Further, with such printing machine, the program storing unit stores therein the program for realizing the specific function, with service permit information representative of service permit/prohibition of the specific function being stored in the service permit information storing unit.

And, the data processing unit allows the display unit to provide the display of only the specific function with its associated service permit information rendered available for service whereby, when the specific function displayed over the display unit is selected by the user, the program interrelated with such specific function is retrieved from the data processing unit to execute the operation for realizing such specific function.

That is, with such a printing machine, the specific function whose service permit information is prohibited is not displayed over the display unit and, even though the program intended to realize the specific function whose service permit information is prohibited is stored in the program storing unit, such a program is not available from the program storing unit to be retrieved. However, when service permit information of such specific function is rewritten from the service prohibition state to the service permit state, such specific function is displayed over the display unit whereby, when such specific function is selected by the user, the operation for realizing such specific function is executed.

According to a second aspect of the present invention, the specific function includes a function interrelated with the print data to be produced in the data processing unit.

According to the second aspect of the present invention, the display unit provides the display of the specific function correlated with the production of print data wherein service permit information is rendered available for service whereby, when the specific function correlated with the production of print data is selected by the user, the data processing unit executes the operation in dependence on the program for realizing such specific function to reproduce print data on the print sheet.

According to a third aspect of the present invention, the specific function includes a function interrelated with acquisition of data, to be printed, in the data processing unit.

According to the third aspect of the present invention, the display unit provides the display of the specific function correlated with the acquisition of data, to be printed, with service permit information being rendered available for service whereby, when the specific function correlated with the acquisition of data to be printed is selected by the user, the data processing unit executes the operation in accordance with the program for realizing such specific function to obtain data to be printed.

According to a fourth aspect of the present invention, the service permit information stored in the service permit information storing unit is rewritable.

BRIEF DESCRIPTI-ON OF THE DRAWINGS

FIG. 2 is a display example of a display and input unit of the printing machine shown in FIG. 1;

FIG. 3 is a view illustrating an example of a data structure of service permit information stored in a service permit information storing unit of the printing machine shown in FIG. 1;

FIG. 4 is a flow chart for illustrating the basic sequence of operation of the printing machine shown in FIG. 1;

FIG. 5 is a typical view illustrating a rewriting device for rewriting service permit information stored in the service information storing unit of the printing machine shown in FIG. 1;

FIG. 6 is a flow chart for illustrating the basic sequence of operation for rewriting service permit information using the rewriting device shown in FIG. 5; and FIG. 7 is a view of an example of a data structure of service permit information rewritten on the basis sequence of FIG. 6.

DETAILED DESCRIPTION OF THE PREFERRED EMBODIMENTS

Figure 1:
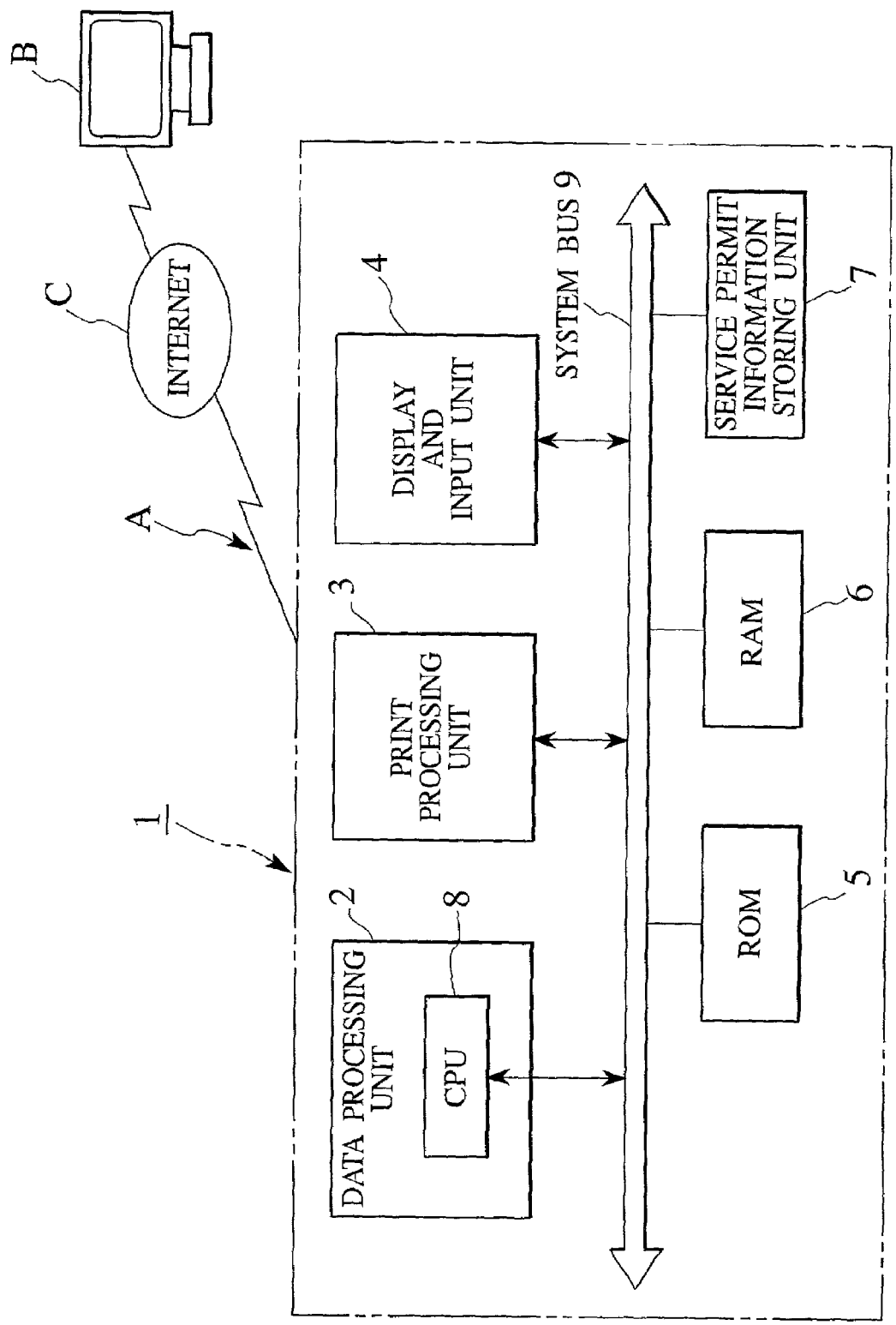
FIG. 1 is a block diagram illustrating a printing system incorporating a printing machine of a preferred embodiment according to the present invention.

To describe the present invention more in detail, a printing machine of a preferred embodiment according to the present invention will be described below in detail with reference to the drawings.

Referring now to FIG. 1, there is shown a printing machine 1, of a preferred embodiment according to the present invention, that serves as a client computer to form a printing system A and connected to, for example, a server personal computer B through a network C such as a LAN (Local Area Network) or a telecommunication line, etc. to allow image or character rows, desired to be printed, to be produced on an application program of the server personal computer B. The printing machine 1 includes a data processing unit 2, a print processing unit 3, a display and input device 4, a ROM 5, a RAM 6 and a service permit information storing unit 7.

The data processing unit 2 includes a central processing unit (CPU) 8 which serves to obtain data, such as an image desired to be printed and input to the printing machine 1, from the server computer B via data input devices such as a network port, a parallel port and a serial port, or a data retrieving device such as a scanner, with such data being processed and converted into the form of print data suited for the printing machine 1.

The CPU 8 of the data processing unit 2 is connected to the print processing unit 3, the display and input device 4, the ROM 5, the RAM 6 and the service permit information storing unit 7 via a system bus 9. The CPU 8 operates on a control program stored in the ROM 5 to obtain data, such as the image desired to be printed, and executes the data processing operation. Further, the CPU 8 serves to control a whole sequence of operations of the printing machine 1 on the basis of the control program previously discussed.

The print processing section 3 is controlled with the CPU 8 to implement printing operation on a print sheet to create the desired image to be printed in dependence on print data produced by the data processing unit 2.

The display and input device 4 is also controlled with the CPU 8 to provide a display of various information necessary for executing the printing operation while serving to receive command inputs from a user and, as shown in FIG. 2, includes a liquid crystal display device of a touch panel type which is comprised of a liquid crystal display panel 11 for providing a display of various information items and operation keys, and a touch panel 12 located in an area where the operation keys of the liquid crystal display panel 11 are displayed. And, with such a printing machine 1 according to the present invention, the display and input device 4 is further provided with, in addition to the operation keys for commanding a normal printing operation, a display of operation keys (hereinafter referred to as specific function selection keys) which enables commands to execute specific operational functions whereby when the user touches a portion of a specific area where the specific function selection keys are displayed, specific functions defined in a data structure which will be described later, represented with the specific function selections keys, are able to be selected and executed in operation.

More particularly, as shown in FIG. 2, the display and input device 4 includes a display segment Ha which indicates "Select Function" and a display segment lib which indicates "Enable copy", "100% " and "Auto Sheet Feed". The touch panel 12 has a function selection key 12a for a "Rotation At 180 degrees" function, a function selection key 12b for a "Clockwise Rotation At 90 Degrees" function, a function selection key 12c for a "Counter-clockwise Rotation At 90 Degrees" function, a function selection key 12d for a "Reversing White And Black" function, a function selection key 12e for a "Local Mode" function and a function selection key 12f for a "Remote Mode" function. Further, the touch panel has function keys 12g, 12h, 12i, 12j, 12k, 12m, 12n and 12p for "Compression", "Equal Magnification", "Enlargement", "Select Sheet", "Zooming", "Thin", "Automatic" and "Rich", respectively.

Here, the specific functions defined in the data structure take the form of specific functions that can be selected by selectively depressing the function selection keys 12a to 12f when desired and that involve, for example, the "Rotation At 180 Degrees" function which allows an orientation of the image to be printed to be rotated at 180 degrees, the "Clockwise Rotation At 90 degrees" function which allows the orientation of the image to be printed to be rotated clockwise at 90 degrees, the "Counter-clockwise Rotation At 90 degrees" function which allows the orientation of the image to be printed to be rotated counter-clockwise at 90 degrees, and the "Reversing White and Black" function which allows white and black areas of the image to be printed to be substituted, with these specific functions being exemplarily shown as described in first, second, fourth and eighth sections of the data structure 10 from left hand respectively, shown in FIG. 3. These specific functions serve as functions interrelated with print data to be produced in the data processing unit 2 whereby, for example, when the "Rotation At 180 degrees" function is selected, the data processing unit 2 produces print data to cause the image which is rotated at 180 degrees to be created by the printing unit 3 on the basis of such print data such that the print sheet is reproduced with the desired image which is rotated at 180 degrees.

Further, the specific functions additionally involves, for example, other functions related for obtaining data in the data processing unit 2, for example, such as a "Local Mode" function enabling to receive only an input from the network port or the parallel port, and a "Remote Mode" function enabling to receive the input only from the serial port, during data transmission through the network, with these specific functions being exemplarily shown as described in sixth and seventh sections of the data structure 10 from left hand respectively, shown in FIG. 3. When the "Local Mode" function is selected, only data that are transmitted through the LAN are input from the network port and the parallel port to be obtained by the data processing unit 2. Also, when the "Remote Mode" function is selected, only data that are transmitted through the telephone communication line are input from the serial port to be obtained by the data processing unit 2.

Also, the present invention is not limited to the specific functions previously set forth and may involve all other functions required for obtaining supplemented values in various operational steps in the printing machine 1.

The ROM 5 includes a memory stored in the control program for controlling the whole sequence of operations of the printing machine 1. The retrieval of and execution of the control program, which is stored in the ROM 5, by the CPU 8 of the data processing unit 2 allows the whole operational steps of the printing machine 1 to be controlled.

In addition, the ROM 5 stores thereon all the programs for realizing the various specific functions previously discussed above. In particular, in the printing machine 1, the ROM 5 preliminarily stores thereon, in addition to the programs for realizing the specific functions whose services are permitted to use under a contract, other programs required for realizing the specific functions whose services are prohibited.

And, when either one of the specific functions whose services are permitted to use is selected, the program that corresponds to the selected specific function is retrieved and executed by the CPU 8 of the data processing unit 2 for allowing the data processing unit 2 to execute the operational steps for realizing the particular specific functions.

The RAM 6 may take the form of a memory utilized in a work area when the CPU 8 of the data processing unit 2 executes a computing operation. Further, the RAM 6 also functions as a buffer for temporarily retaining print data produced by the data processing unit 2.

The service permit information storing unit 7 serves to store service permit information representative of service permit/prohibition capabilities of the various specific functions described in the data structure previously noted and may take the form of, for example, computer readable record medium of a rewriting type, such as a non-volatile memory (EEPROM), a hard disk or a memory card. The service permit information stored in the service permit information storing unit 7 may take the form of, for example, a service permit/prohibition flag allocated in an address numbered 3 wherein, as shown in FIG. 3, the specific function whose service is permitted is assigned with a logic "1" at the address numbered 3 and the specific function whose service is prohibited is assigned with a logic "0" at the address numbered 3. In an example of the data structure shown in FIG. 3, the various specific functions, i.e. the "Rotation At 180 degrees" function, the "Clockwise Rotation At 90 degrees" function, the "Counter-clockwise Rotation At 90 degrees" function, the "Local Mode" function and the "Remote Mode" function are described in the states of the services that are permitted whereas the service of the specific function of "Reversing White and Black" is prohibited. Also, service permit information stored in the service permit information storing unit 7 is disenabled to be rewritten by the user while enabling a service person to use a specific tool to enable rewriting of such a content for thereby permitting service permit information to be rewritten.

Now, the operation of the printing machine 1 of such a structure previously set forth is described below in detail with reference to a flow chart of FIG. 4.

In step S1, initially, an electric power supply of the printing machine 1 is turned on and in step S2, the CPU 8 of the data processing unit 2 retrieves service permit information, representing the service permit/prohibition capabilities of the various specific functions, from the service permit information storing unit 7 for thereby recognizing, among the various specific functions, which specific function remains in the service permit or which specific function remains in the service prohibited. More particularly, the retrieval of service permit information defined in the data structure shown in FIG. 3, executed by the CPU 8 from the service permit information storing unit 7, provides a recognition that the various specific functions, i.e. the "Rotation At 180 degrees" function, the "Clockwise Rotation At 90 degrees" function, the "Counter-clockwise Rotation At 90 degrees" function, the "Local Mode" function and the "Remote Mode" function are permitted for service whereas the function of "Reversing White and Black" is prohibited for use.

In next step of S3, the CPU 8 controls the display and input device 4 to compel it to provide a display of the specific function selection keys representing the specific functions that are permitted for use. In particular, for example, in the example previously set forth, the CPU 8 compels the display and input device 4 to provide the display of the specific function selection keys interrelated with the various specific functions, i.e. the "Rotation At 180 degrees" function, the "Clockwise Rotation At 90 degrees" function, the "Counter-clockwise Rotation At 90 degrees" function, the "Local Mode" function and the "Remote Mode" function, respectively. In the step of S3, the specific function key representing the "Reversing White and Black" function that are prohibited by user is not displayed by the display and input device 4.

In consecutive step S4, the CPU 8 judges whether the specific functions are selected over the display and input device 4, i.e. whether the specific functions deemed to be permitted are selected. And, if the judgment appears that the permitted specific functions are selected, the operation goes to step S5 wherein the CPU 8 retrieves the programs, interrelated with the permitted specific functions, from the ROM 5 and utilizes the RAM 6 as the work area to execute the operation to realize the selected specific functions.

More particularly, for example, when the "Rotation At 180 degrees" function is selected, the CPU 8 retrieves the program interrelated with the "Rotation At 180 degrees" function, on the basis of which the CPU 8 implements data processing of data of the image to be printed obtained via the network or the data read out unit such as the scanner for thereby producing print data. And, the print processing unit 3 is operated to perform the printing operation based on the print data product such that the image is created in an orientation that is reversed at an angle of 180 degrees.

Further, for example, when the "Local Mode" function is selected, the CPU 8 retrieves the program interrelated with the "Local Mode" function, on the basis of which the CPU 8 controls so as to receive only data of the image that is transmitted through the LAN and inputted from the network port and the parallel port. And, data of the image to be printed is input from the network port and the parallel port and, when the print command is input, the CPU 8 serves to obtain data of the image to be printed that is input whereupon such data is converted into the form of print data. And, the execution of the printing operation by the print processing unit 3 on the basis of print data allows the image to be printed to be created on the print sheet.

In step S4, further, during a time interval wherein the specific functions to be permitted for service are not selected, the CPU remains in a wait condition until the specific functions to be permitted for service are selected.

With the printing machine 1 according to the present invention, as previously set forth, the ROM 5 stores thereon, in addition to the programs for realizing the specific functions that are permitted for service under the contract, all the programs for realizing the specific functions that are prohibited for use, with service permit information representing the service permit/prohibition capabilities interrelated with such specific functions being stored in the service permit information storing unit 7. And, the display of only the specific function selection keys, interrelated with the specific functions compelled to be permitted for use in service permit information, over the display and input device 4 enables the user to perform selection of the desired selection keys whereby, when the specific functions displayed over the display and input device 4 are selected by the user, the CPU enables the operation to be executed for realizing the selected specific functions.

With the printing machine 1, as a consequence, merely rewriting service permit information stored in the service permit information storing unit 7 by the service person with the use of he specific rewriting device enables addition, deletion and alteration of the specific functions to be initiated to be available for use, resulting in a remarkable convenience especially when it is desired for the users to alter the respective specific functions to be available for use depending on environments in service of the printing machine 1 or when different specific functions are desired by respective users. That is, while there are some instances where it is desired to replace the printing machine per se or to rewrite the programs for realizing the specific functions stored in the memory inside the printing machine or where, when there are different specific functions desired by respective users, customized programs for the respective users are required to be produced, the printing machine 1 to which the present invention is applied merely needs for the service person to rewrite service permit information stored in the service permit information storing unit 7 with the use of the specific tool enables the user to add, delete and alter the specific functions to be available for service and to use only the specific functions desired by the user without requiring an excessively heavy load to be exerted on the user and without requiring a troublesome work.

Now, the operation of the printing machine 1 is described below with a particular reference to a method of rewriting service permit information stored in the service permit information storing unit 7.

When rewriting service permit information stored in the service permit information storing unit 7, for example, a specific rewriting device 20 shown in FIG. 5 is employed for rewriting service permit information. The rewriting device 20 is comprised of a plurality of input keys 21 for executing input operations, a display section 22, a mount section, which is not shown, for allowing the service permit information storing unit 7 to be mounted, and an information rewriting unit, which is not shown, for reading out available service permit information from the service permit information storing unit 7, mounted in the mount section, and rewriting the same.

And, when needed to add, delete or alter the contents of the specific functions in the printing machine 1, the service person takes out the service permit information storing unit 7, which for example may take the form of the EEPROM, from the printing machine 1 and then puts the service permit information storing unit 7 into the mount section of the rewriting device 20, which allows the service person to execute the operational steps shown, for permit information.

That is, first in step S11, the service permit information storing unit 7 taken out from the printing machine 1 is installed into the mount section of the rewriting device 20 and, when an electric power supply of the rewriting device 20 is turned on, in step S12, service permit information is read out by the information rewriting unit from the service permit information storing unit 7 to allow the display section 22 to provide a display of a receipt of service permit information and a display of whether the respective specific functions are rendered to be available for use or remain in the prohibited states.

In next step S13, depressing upper and lower buttons 21a, 21b allows a cursor to be shifted up and down. And, in step S14, the cursor is settled to a particular specific function among the respective specific functions displayed over the display section 22 and, under such a condition, it is discriminated whether a start button 21c is depressed such that, if the start button 21c is discriminated as being depressed, then, the particular specific function, associated with the cursor, is selected as an object of the specific function whose service permit information is to be rewritten.

When such a specific function is selected as the object to rewrite service permit information, in consecutive step S15, the display section 22 provides the display of a message for confirmation of rewriting of particular specific function.

In subsequent step S16, under a condition where the confirmation message is displayed by selecting the particular specific function among the respective specific functions displayed over the display section 22, discrimination is made whether a stop button 21d is depressed. And, when it is discriminated that the stop button 21d is depressed, selection of this particular specific function is cancelled and the operation return to step S13 wherein the operation is executed to select the specific function, whose service permit information is to be rewritten, again. In contrast, when it is discriminated that the stop button 21d is not depressed, the operation goes to step S17 wherein it is discriminated whether the start button 21c is depressed.

In step S17, when it is discriminated that the start button 21c is not depressed, the operation goes to step S16 wherein it is further discriminated whether the stop button 21d is depressed. On the contrary, when it is discriminated that the start button 21c is depressed, the operation goes to step S18 wherein the information rewriting unit is enabled to rewrite service permit information of the selected specific function.

In particular, for example, if the "Reversing White And Black" function, which has been previously remained in the prohibited state, is selected and the start button 21c is depressed while the stop button 21d is not depressed, in step S18, the information rewriting unit rewrites a logic "0" into a logic "1" at the address numbered 3 of service permit information interrelated with the "Reversing White And Black" function. As a result, service permit information shown in FIG. 3 is altered to a data structure 10' shown in FIG. 7.

When the rewriting operation of service permit information is terminated in a manner as discussed above, the service permit information storing unit 7 that stores service permit information in the data structure 10' which is rewritten is taken out from the rewriting device 20 and is mounted to the printing machine 1. And, when the electric power supply of the printing machine 1 is turned on, newly rewritten service permit information is retrieved from the service permit information storing unit 7 and the specific function selection keys interrelated with the specific functions which are available for service are displayed over the display and input device 4.

More particularly, for example, if service permit information of the data structure 10' shown in FIG. 7 is retrieved from the service permit information storing unit 7, the display and input device 4 provides a display of, in addition to the specific function selection keys interrelated with the "Rotation at 180 degrees" function, the "Clockwise Rotation At 90 Degrees" function, the Counter-clockwise Rotation At 90 Degrees" function, the Local Mode" function and the "Remote mode" function, a new specific function selection key interrelated with the "Reversing White And Black" function. And, when such "Reversing White And Black" function is selected by the user, the program correlated with the "Reversing White And Black" function is retrieved from the ROM 5 for executing the operation for realizing the "Reversing White And Black" function. With such an operation, the printing operation is carried out to create the image wherein the white and black areas are inversed.

As will be appreciated from the foregoing description, the printing machine 1 to which the present invention is applied concerns a capability of enabling the service person to perform an extremely easy operation with the use of the specific rewriting device 20 for rewriting service permit information representative of the service permit/prohibition of the specific function to allow the specific functions to be added, deleted and altered.

While the printing machine 1 of the present invention has been described above with reference to particular examples, it is to be noted that the present invention is not intended to be limited to those examples and may have various modifications depending on purposes in service. For example, in the foregoing examples described above, although the display and input device has been shown as providing the display of the specific function selection keys interrelated with the specific functions which are available for service, the display and input device may be divided into a display unit and an input unit to allow the display unit to provide a display of names of the respective specific functions which are rendered available for service while allowing an associated input button, when it is depressed, to execute a desired operation for realizing a selected specific function.

What is claimed is:

1. A printing machine comprising:
   a data processing unit for obtaining data for printing and converting said data to print data;
   a print processing unit for executing printing operation as functions on the basis of the print data produced by said data processing unit;
   a program storing unit for storing programs for realizing specific functions;
   a service permit information storing unit for storing service permit information representative of each of service permit and prohibition of prohibited ones of specific functions; and
   a display unit for providing to a user a display of various information,
   wherein said data processing unit allows said display unit to provide only display of service permitted specific functions in said service permit information so as to avoid display of said prohibited ones of specific functions in said service permit information, and allows retrieval of a program interrelated with a service permitted specific function from said service permit information storing unit to execute an operation for realizing the service permitted specific function when the specific function displayed over said display unit is selected, and does not allow access to said service prohibited specific functions, wherein the data processing unit deletes display functions, displayed to the user, for prohibited functions.

2. The printing machine according to claim 1, wherein said specific function includes a function interrelated with said print data to be produced in said data processing unit.

3. The printing machine according to claim 1, wherein said specific function includes a function interrelated with acquisition of data, to be printed, in said data processing unit.

4. The printing machine according to claim 1, wherein said service permit information stored in said service permit information storing unit is rewritable.

5. The printing machine according to claim 4, wherein said data processing unit allows said display unit to provide display of specific functions that are newly permitted by rewriting said service permit information and delete display of specific functions that are newly prohibited by rewriting said service permit information from said display unit.

* * * * *